(12) United States Patent
Sakaguchi et al.

(10) Patent No.: US 11,755,037 B2
(45) Date of Patent: Sep. 12, 2023

(54) POSITIONING OF UNMANNED AERIAL VEHICLES USING MILLIMETER-WAVE BEAM INFRASTRUCTURE

(71) Applicant: Fraunhofer-Gesellschaft zur Foerderung der angewandten Forschung e.V., Munich (DE)

(72) Inventors: Kei Sakaguchi, Berlin (DE); Kim Mahler, Berlin (DE); Thomas Haustein, Potsdam (DE); Wilhelm Keusgen, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 611 days.

(21) Appl. No.: 16/529,263

(22) Filed: Aug. 1, 2019

(65) Prior Publication Data

US 2019/0354117 A1 Nov. 21, 2019

Related U.S. Application Data

(63) Continuation of application No. PCT/EP2018/051786, filed on Jan. 25, 2018.

(30) Foreign Application Priority Data

Feb. 2, 2017 (EP) .................................... 17154433

(51) Int. Cl.
*G05D 1/10* (2006.01)
*B64C 39/02* (2023.01)
(Continued)

(52) U.S. Cl.
CPC ............ *G05D 1/101* (2013.01); *B64C 39/024* (2013.01); *G01S 5/0218* (2020.05); *G01S 5/0273* (2013.01); *G01S 19/14* (2013.01); *B64U 2201/20* (2023.01)

(58) Field of Classification Search
CPC ............................ G05D 1/101; B64C 39/024; B64C 2201/146; G01S 5/0215; G01S 5/0273; G01S 19/14
See application file for complete search history.

(56) References Cited

U.S. PATENT DOCUMENTS

| 3,375,520 A | 3/1968 | De Groot et al. |
| 4,740,792 A | 4/1988 | Sagey et al. |
| (Continued) | | |

FOREIGN PATENT DOCUMENTS

| CN | 87105803 A | 6/1988 |
| CN | 1210405 A | 3/1999 |
| (Continued) | | |

OTHER PUBLICATIONS

Tang et al., "A high-precision millimeter-wave navigation system for indoor and urban environment autonomous vehicles", 2013, IEEE MTT-S International Microwave Symposium Digest (Year: 2013).*

(Continued)

*Primary Examiner* — Peter D Nolan
*Assistant Examiner* — Roy Rhee
(74) *Attorney, Agent, or Firm* — Perkins Coie LLP; Michael A. Glenn

(57) ABSTRACT

Embodiments provide an unmanned aerial vehicle comprising a receiver and a position determiner. The receiver is configured to receive two periodic wideband signals transmitted from two spaced apart base stations of a navigation system for unmanned aerial vehicles, wherein the two periodic wideband signals are time-synchronized. The position determiner is configured to determine a position of the unmanned aerial vehicle relative to the two base stations based on a difference between reception times of the two periodic wideband signals and based on reception intensities of the two periodic wideband signals.

24 Claims, 11 Drawing Sheets

(51) Int. Cl.
*G01S 5/02* (2010.01)
*G01S 19/14* (2010.01)

(56) References Cited

U.S. PATENT DOCUMENTS

| | | | |
|---|---|---|---|
| 5,509,028 A * | 4/1996 | Marque-Pucheu | H04B 7/155 |
| | | | 370/279 |
| 6,160,801 A | 12/2000 | Uchida et al. | |
| 6,246,361 B1 * | 6/2001 | Weill | G01S 5/0268 |
| | | | 342/357.57 |
| 6,675,013 B1 | 1/2004 | Gross et al. | |
| 2002/0002066 A1 | 1/2002 | Pallonen | |
| 2004/0192330 A1 | 9/2004 | Gaal | |
| 2007/0247368 A1 | 10/2007 | Wu | |
| 2010/0265128 A1 | 10/2010 | Martens et al. | |
| 2012/0327906 A1 * | 12/2012 | Alcorn | H04B 7/18506 |
| | | | 370/331 |
| 2014/0032034 A1 | 1/2014 | Raptopoulos et al. | |
| 2016/0047883 A1 | 2/2016 | Baker et al. | |
| 2017/0248969 A1 * | 8/2017 | Ham | G05D 1/1064 |
| 2018/0003827 A1 * | 1/2018 | Farrokhi | G01S 19/07 |
| 2018/0088162 A1 * | 3/2018 | Ndip | H04B 17/102 |
| 2018/0145744 A1 * | 5/2018 | Petranovich | H04B 7/18508 |
| 2018/0155056 A1 * | 6/2018 | Balaresque | B64C 27/08 |

FOREIGN PATENT DOCUMENTS

| | | |
|---|---|---|
| CN | 1220069 A | 6/1999 |
| CN | 1413056 A | 4/2003 |
| CN | 1439203 A | 8/2003 |
| CN | 101286808 A | 10/2008 |
| CN | 101707805 A | 5/2010 |
| CN | 101969692 A | 2/2011 |
| CN | 102426426 A | 4/2012 |
| CN | 102547570 A | 7/2012 |
| CN | 102711044 A | 10/2012 |
| CN | 103809155 A | 5/2014 |
| CN | 104159291 A | 11/2014 |
| CN | 104697517 A | 6/2015 |
| CN | 204461441 U | 7/2015 |
| CN | 105372626 A | 3/2016 |
| CN | 105425208 A | 3/2016 |
| CN | 106093850 A | 11/2016 |
| CN | 106093855 A | 11/2016 |
| CN | 106205136 A | 12/2016 |
| CN | 106291455 A | 1/2017 |
| CN | 106324561 A | 1/2017 |
| EP | 2603814 A2 | 6/2013 |
| GB | 2380881 A | 4/2003 |
| JP | H05126932 A | 5/1993 |
| JP | 2000180528 A | 6/2000 |
| JP | 2012042476 A | 3/2012 |
| WO | 2012021547 A2 | 2/2012 |
| WO | 2016198958 A1 | 12/2016 |

OTHER PUBLICATIONS

Amazon Prime Air, "Revising the Airspace Model for the Safe Integration of Small Unmanned Aircraft Systems", Jul. 2015, 3 pp.

Devasia, Santosh et al., "A Scalable Low-Cost-UAV Traffic Network (uNet)", arXiv preprint arXiv:1601.01952, Jan. 11, 2016, 21 pp.

Psiaki, Mark L. et al., "GNSS Spoofing and Detection", Proceedings of the IEEE, vol. 104, No. 6, Jun. 2016, pp. 1258-1270.

Tang, Adrian et al., "A High-Precision Millimeter-Wave Navigation System for Indoor and Urban Environment Autonomous Vehicles", Microwave Symposium Digest (IMS), 2013 IEEE MTT-S International, Seattle, WA, 2013, pp. 1-3.

Wikipedia, "Microwave landing system", URL: https://en.wikipedia.org/wiki/Microwave_landing_system, Sep. 12, 2019, 6 pp.

Wikipedia, "Microwave scanning beam landing system", URL: https://en.wikipedia.org/wiki/Microwave_Scanning_Beam_Landing_System, Apr. 3, 2018, 1 pp.

Aasish, C et al., "Navigation of UAV without GPS", Robotics, Automation, Control and Embedded Systems (RACE), 2015 International Conference on, Chennai, 2015, pp. 1-3.

Shanmugavel, Madhavan, "Collision avoidance and path planning of multiple UAVs using flyable paths in 3D", Methods and Models in Automation and Robotics (MMAR), 2010 15th International Conference on, Miedzyzdroje, 2010, pp. 218-222.

* cited by examiner

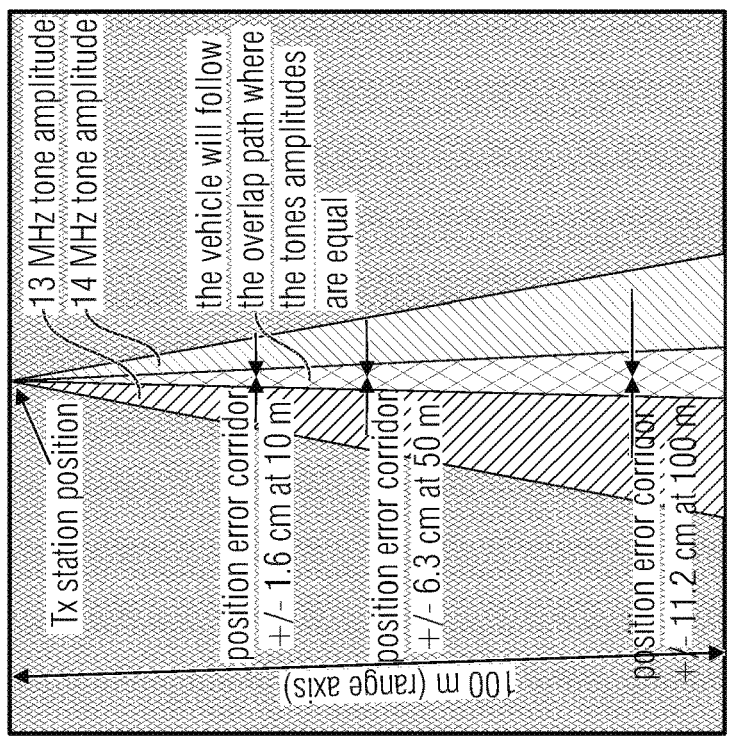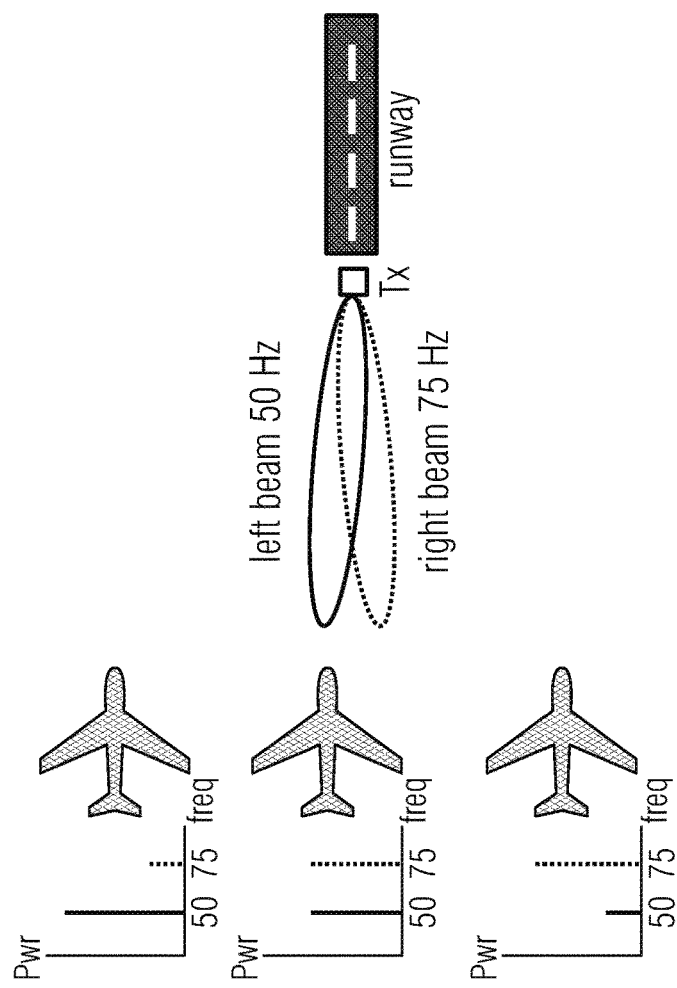
Fig. 1

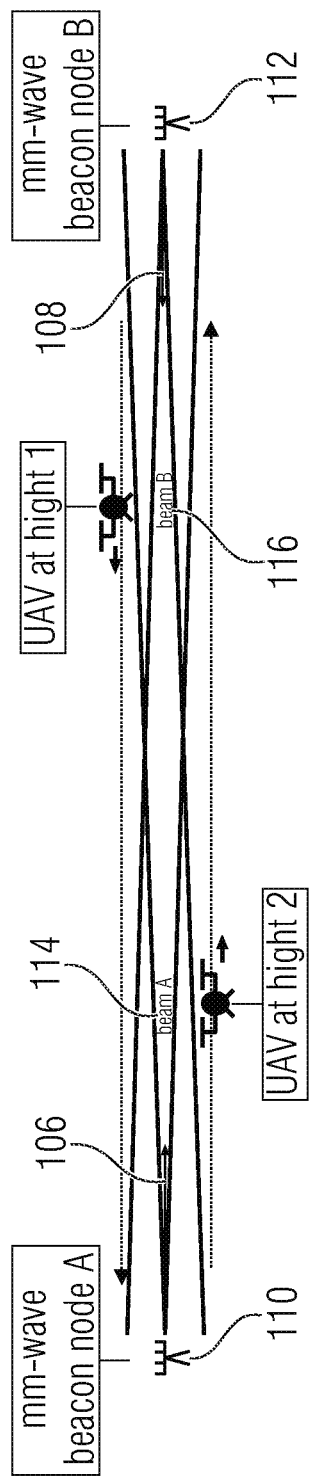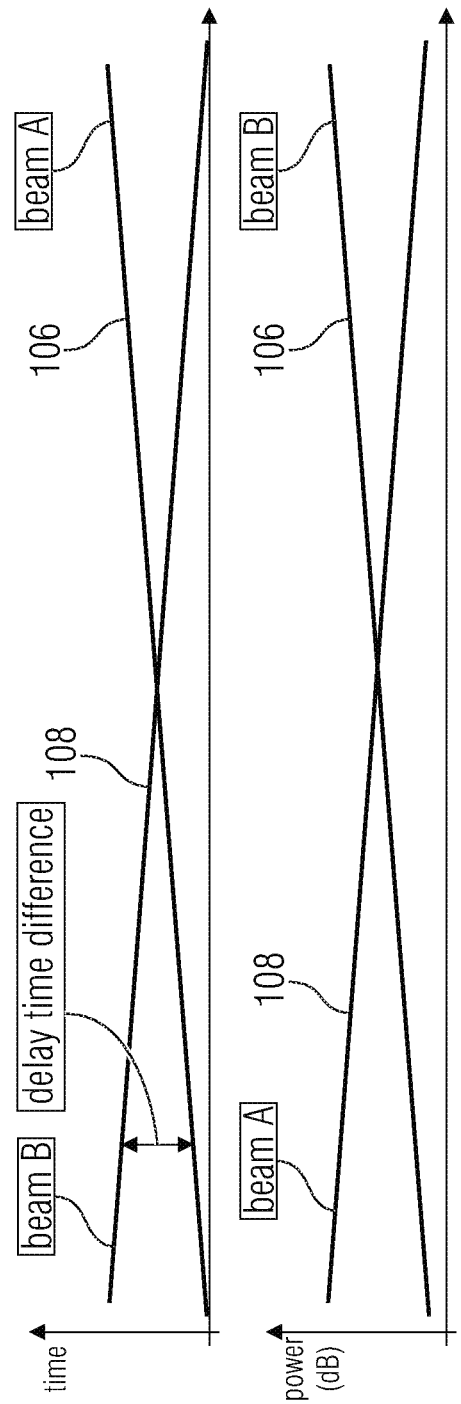

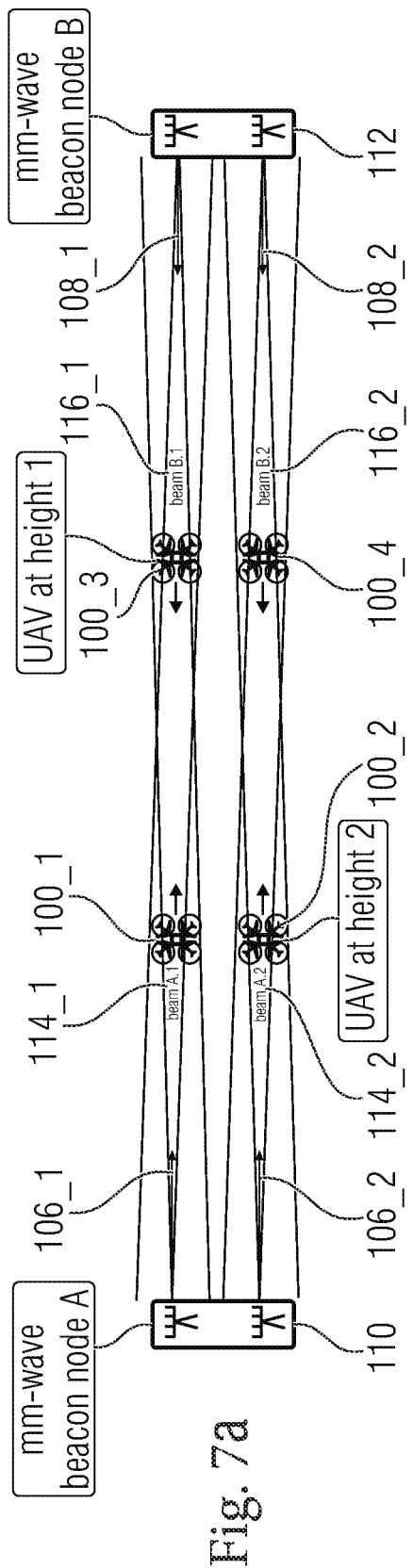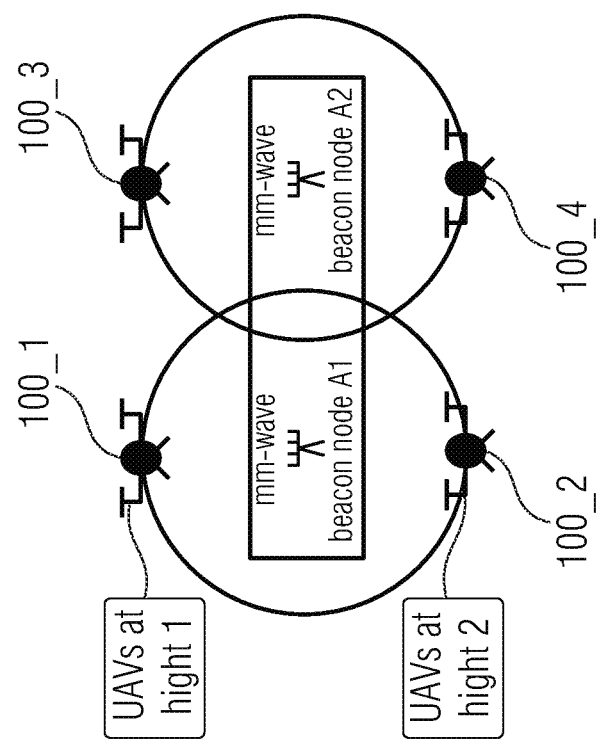
Fig. 7a
Fig. 7b

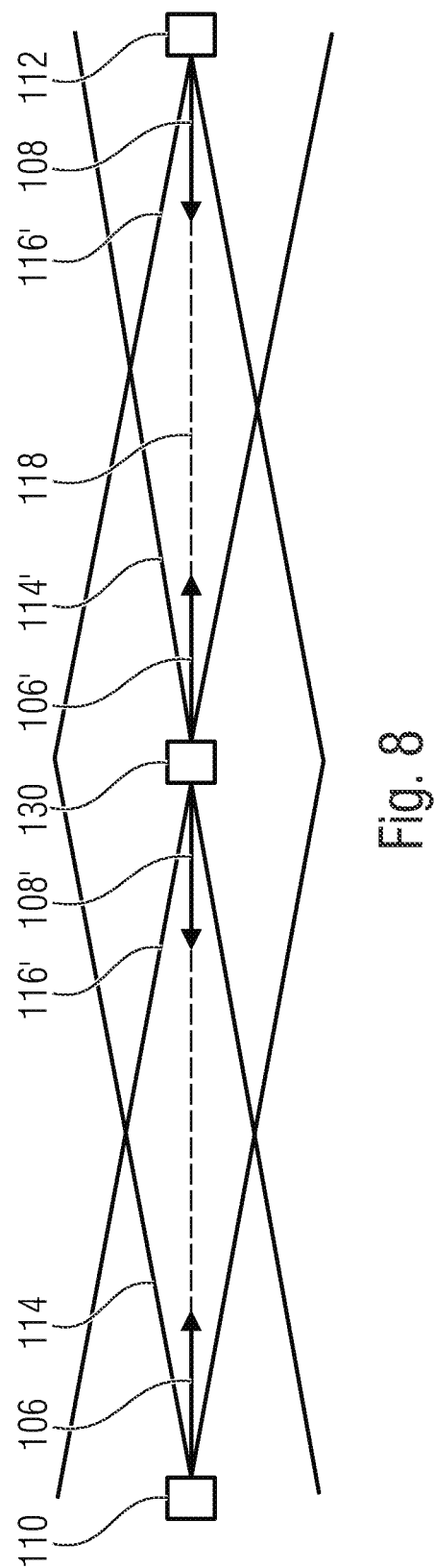

POSITIONING OF UNMANNED AERIAL VEHICLES USING MILLIMETER-WAVE BEAM INFRASTRUCTURE

CROSS-REFERENCES TO RELATED APPLICATIONS

This application is a continuation of copending International Application No. PCT/EP2018/051786, filed Jan. 25, 2018, which is incorporated herein by reference in its entirety, and additionally claims priority from European Application No. EP 17 154 433.1, filed Feb. 2, 2017, which is incorporated herein by reference in its entirety.

Embodiments relate to an unmanned aerial vehicle. Further embodiments relate to a navigation system for unmanned aerial vehicles. Some embodiments relate to positioning of unmanned aerial vehicles using mm-wave beam infrastructure.

BACKGROUND OF THE INVENTION

The automated navigation of unmanned aerial vehicles (UAV) at low altitudes in the so-called urban "Low-Speed Localized Traffic" area [Amazon Prime Air, "Revising the Airspace Model for the Safe Integration of Small Unmanned Aircraft Systems", July 2015], may use an adequate unmanned aerial vehicles traffic management (UTM) system. The major concern of such a system is safe maneuvering of UAVs in an urban environment, without causing any harm or danger. Another concern is cost-efficient implementation of such a system, while being reliable.

A constant and dependable communication link between the UAVs in the field and the UAV command center is also needed, in order to maintain control of the entire UAV fleet.

Different from UAV flight paths above houses, flight paths between high buildings in narrow street canyons near the ground level of dense urban environments have limited coverage of positioning satellite. Therefore, such a system may not depend on global navigation satellite system (GNSS) satellite positioning. This applies even more for navigation of automated UAV flights in an indoor environment.

An additional problem is inherent to satellite positioning systems: GNSS is vulnerable to jamming or spoofing [M. L. Psiaki and T. E. Humphreys, "GNSS Spoofing and Detection," in Proceedings of the IEEE, vol. 104, no. 6, pp. 1258-1270, June 2016], which can lead to hazardous situations.

In order to navigate UAVs without GNSS, [Aasish C, Ranjitha E., Razeen Ridhwan U, Bharath Raj S and Angelin Jemi L., "Navigation of UAV without GPS," Robotics, Automation, Control and Embedded Systems (RACE), 2015 International Conference on, Chennai, 2015, pp. 1-3] proposes an "optical flow navigation", which is a technique used to determine the motion of objects in relation to the observer. This proposal may use camera sensors and adequate data processing algorithms installed in the UAV, which increases the complexity and cost of UAVs. Furthermore, this approach is not able to ensure that the UAV follows a predefined airway.

"A microwave landing system (MLS) is an all-weather, precision landing system, which has a number of operational advantages, including a wide selection of channels to avoid interference with other nearby airports, excellent performance in all weather, a small "footprint" at the airports, and wide vertical and horizontal "capture" angles that allowed approaches from wider areas around the airport" [https://en.wikipediaorg/wiki/Microwave_landing_system].

"The Microwave Scanning Beam Landing System (MS-BLS) is a Ku band approach and landing navigation aid formerly used by NASA's space shuttle. It provides precise elevation, directional and distance data which was used to guide the orbiter for the last two minutes of flight until touchdown" [https://en.wikipedia.org/wiki/Microwave_Scanning_Beam_Landing_System].

FIG. 1 shows an illustrative view of an instrument landing system (ILS) and a beam pattern used by the ILS. As shown in FIG. 1, the ILS uses a transmit (Tx) station transmitting partially overlapping left and right beams, e.g., at 50 Hz and 75 Hz, respectively. An aerial vehicle will follow an overlap path of the left and right beams along which the received powers of the left and right beams are equal. In other words, FIG. 1 shows an operation of navigation system on the left and a numerically generated beam pattern from lens and beam cross-section measurements on the right.

A High-Precision Millimeter-Wave Navigation System for Indoor and Urban Environment Autonomous Vehicles is proposed in [A. Tang and Q. Gu, "A high-precision millimeter-wave navigation system for indoor and urban environment autonomous vehicles," Microwave Symposium Digest (IMS), 2013 IEEE MTT-S International, Seattle, Wash., 2013, pp. 1-3]. The system is suitable for applications where precision guiding of small autonomous vehicles along a precise path may be useful such as navigating indoors or in cluttered urban environments.

The solutions provided in [https://en.wikipedia.org/wiki/Microwave_landing_system], [https://en.wikipedia.org/wiki/Microwave_Scanning_Beam_Landing_System] and [A. Tang and Q. Gu, "A high-precision millimeter-wave navigation system for indoor and urban environment autonomous vehicles," Microwave Symposium Digest (IMS), 2013 IEEE MTT-S International, Seattle, Wash., 2013, pp. 1-3] enable precise landing procedures for UAVs, but are not suitable for an UAV airway system. This may involve that the UAV not only estimates the source of the signal in order to adjust its flight path accordingly, but instead an adequate UAV airway system has to allow for precise position estimates along the designated airway path, hence the position in the three-dimensional space.

Another problem of the above solution is its vulnerability to multipath, which occurs frequently in indoor environments.

SUMMARY

According to an embodiment, an unmanned aerial vehicle may have: a receiver configured to receive two periodic wideband signals transmitted from two spaced apart base stations of a navigation system for unmanned aerial vehicles, wherein the two periodic wideband signals are time-synchronized; and a position determiner configured to determine a position of the unmanned aerial vehicle relative to the two base stations based on a difference between reception times of the two periodic wideband signals and based on reception intensities of the two periodic wideband signals.

According to another embodiment, a navigation system for unmanned aerial vehicles may have: two base stations configured to transmit two time-synchronized periodic wideband signals; wherein the two base stations are adapted to transmit the two periodic wideband signals using beams facing each other to create a flight path for an unmanned aerial vehicle.

According to another embodiment, a method may have the steps of: receiving two periodic wideband signals transmitted from two spaced apart positions, wherein the two periodic wideband signals are time-synchronized; and determining a position of the unmanned aerial vehicle relative to the two spaced apart positions based on a difference between reception times of the two periodic wideband signals and based on reception intensities of the two periodic wideband signals.

According to another embodiment, a method may have the steps of: transmitting two time-synchronized periodic wideband signals from two spaced apart positions using beams facing each other to create a flight path for an unmanned aerial vehicle.

According to another embodiment, a method may have the steps of: transmitting two time-synchronized periodic wideband signals from spaced apart positions using beams facing each other to create a flight path for an unmanned aerial vehicle; receiving the two periodic wideband signals at the unmanned aerial vehicle; and determining a position of the unmanned aerial vehicle relative to the two spaced apart positions based on a difference between reception times of the two periodic wideband signals and based on reception intensities of the two periodic wideband signals.

Another embodiment may have a non-transitory digital storage medium having a computer program stored thereon to perform the method, the method including: receiving two periodic wideband signals transmitted from two spaced apart positions, wherein the two periodic wideband signals are time-synchronized; and determining a position of the unmanned aerial vehicle relative to the two spaced apart positions based on a difference between reception times of the two periodic wideband signals and based on reception intensities of the two periodic wideband signals, when said computer program is run by a computer.

Another embodiment may have a non-transitory digital storage medium having a computer program stored thereon to perform the method, the method including: transmitting two time-synchronized periodic wideband signals from two spaced apart positions using beams facing each other to create a flight path for an unmanned aerial vehicle, when said computer program is run by a computer.

Another embodiment may have a non-transitory digital storage medium having a computer program stored thereon to perform the method, the method including: transmitting two time-synchronized periodic wideband signals from spaced apart positions using beams facing each other to create a flight path for an unmanned aerial vehicle; receiving the two periodic wideband signals at the unmanned aerial vehicle; and determining a position of the unmanned aerial vehicle relative to the two spaced apart positions based on a difference between reception times of the two periodic wideband signals and based on reception intensities of the two periodic wideband signals, when said computer program is run by a computer.

Embodiments provide an unmanned aerial vehicle comprising a receiver and a position determiner. The receiver is configured to receive two periodic wideband signals transmitted from two spaced apart base stations of a navigation system for unmanned aerial vehicles, wherein the two periodic wideband signals are time-synchronized. The position determiner is configured to determine a position of the unmanned aerial vehicle relative to the two base stations based on a difference between reception times of the two periodic wideband signals and based on reception intensities of the two periodic wideband signals.

Further embodiments provide a navigation system for unmanned aerial vehicles, the navigation system comprising two base stations configured to transmit two time-synchronized periodic wideband signals, wherein the two base stations are adapted to transmit the two periodic wideband signals using beams facing each other to create a flight path for an unmanned aerial vehicle.

Further embodiments provide a method, the method comprises a step of receiving two periodic wideband signals transmitted from two spaced apart positions, wherein the two periodic wideband signals are time-synchronized; and a step of determining a position of the unmanned aerial vehicle relative to the two spaced apart positions based on a difference between reception times of the two periodic wideband signals and based on reception intensities of the two periodic wideband signals.

Further embodiments provide a method, the method comprising a step of transmitting two time-synchronized periodic wideband signals from two spaced apart positions using beams facing each other to create a flight path for an unmanned aerial vehicle.

Further embodiments provide a method, the method comprising a step of transmitting two time-synchronized periodic wideband signals from spaced apart positions using beams facing each other to create a flight path for an unmanned aerial vehicle; a step of receiving the two periodic wideband signals at the unmanned aerial vehicle; and a step of determining a position of the unmanned aerial vehicle relative to the two spaced apart positions based on a difference between reception times of the two periodic wideband signals and based on reception intensities of the two periodic wideband signals.

BRIEF DESCRIPTION OF THE DRAWINGS

Embodiments of the present invention will be detailed subsequently referring to the appended drawings, in which:

FIG. 1 shows an illustrative view of an instrument landing system and a beam pattern used by the instrument landing system;

FIG. 6a shows a schematic side view of a navigation system for unmanned aerial vehicles and of two unmanned aerial vehicles, according to an embodiment;

FIG. 6b shows in a diagram a time delay of a reception of the two periodic wideband signals plotted over a position along the flight path between the two base stations, according to an embodiment;

FIG. 6c shows in a diagram a received power of the two periodic wideband signals plotted over a position along the flight path between the two base stations, according to an embodiment;

FIG. 7a shows a schematic top view of a navigation system for unmanned aerial vehicles and of four unmanned aerial vehicles, according to an embodiment;

FIG. 7b shows a cross-sectional view of the two flight paths going from the second base station to the first base station and of four unmanned aerial vehicles, according to an embodiment;

FIG. 8 shows an application example of the navigation system for unmanned aerial vehicles in which the base stations are integrated into street lamps, according to an embodiment;

DETAILED DESCRIPTION OF THE INVENTION

Figure 2:
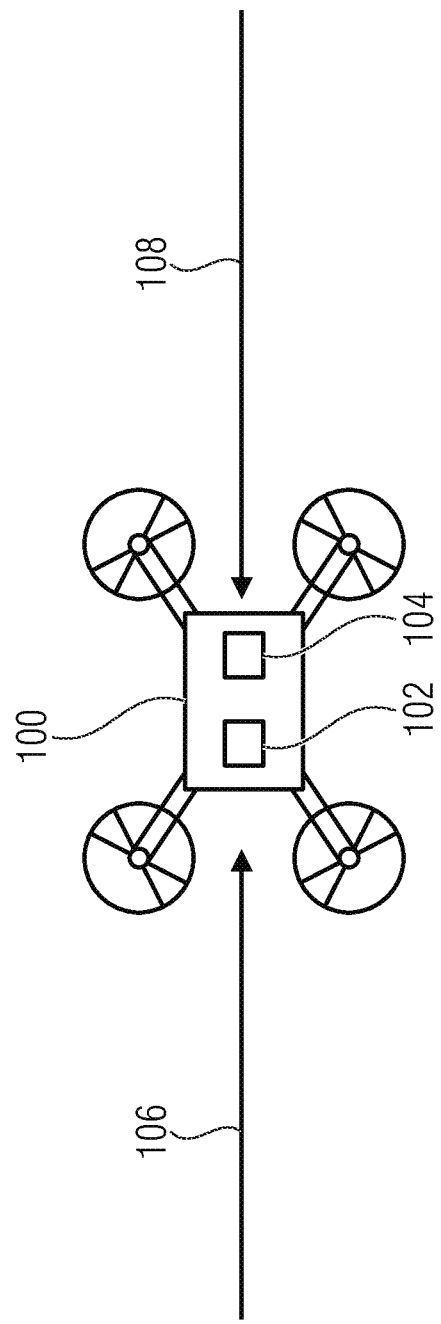
FIG. 2 shows a schematic block diagram of an unmanned aerial vehicle according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 2 shows a schematic block diagram of an unmanned aerial vehicle (UAV) 100 according to an embodiment. The UAV 100 comprises a receiver 102 and a position determiner 104. The receiver 102 is configured to receive two periodic wideband signals 106 and 108 transmitted from two spaced apart base stations of an UAV navigation system, wherein the two periodic wideband signals 106 and 108 are time-synchronized. The position determiner 104 is configured to determine a position of the UAV 100 relative to the two base stations based on a difference between reception times of the two periodic wideband signals 110 and 112 and/or based on reception intensities of the two periodic wideband signals 110 and 112.

In detail, the receiver 102 can be configured to receive a first periodic wideband signal 106 from a first base station and a second periodic wideband signal 108 from a second base station. The first periodic wideband signal 106 and the second periodic wideband signal 108 can be time-synchronized, e.g., the first periodic wideband signal 106 and the second periodic wideband signal 108 can be transmitted at the same transmission time (or time instant). The position determiner 104 can be configured to determine a position of the UAV 100 relative to the first base station and the second base station based on a difference between a reception time of the first periodic wideband signal 106 and a reception time of the second periodic wideband signal 108. Further or alternatively, the position determiner 104 can be configured to determine the position of the UAV 100 relative to the first base station and the second base station based on a reception intensity of the first periodic wideband signal 106 and a reception intensity of the second periodic wideband signal 108.

Figure 3:
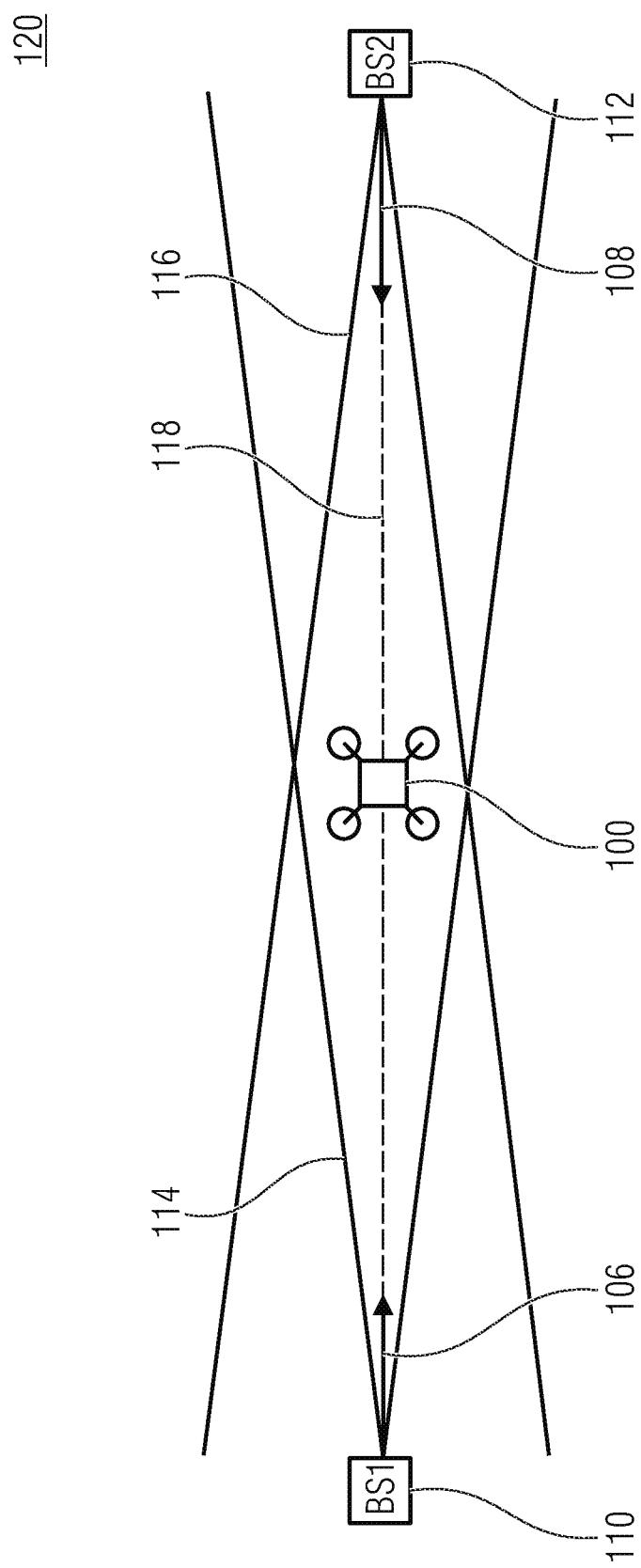
FIG. 3 shows a schematic block diagram of a navigation system for unmanned aerial vehicles, according to an embodiment.

FIG. 3 shows a schematic block diagram of a navigation system 120 for UAVs 100, according to an embodiment. The navigation system 120 comprises two base stations 110 and 112 configured to transmit the two time-synchronized periodic wideband signals 106 and 108, wherein the two base stations 110 and 112 are adapted to transmit the two periodic wideband signals 106 and 108 using beams 114 and 116 facing each other to create a flight path 118 for the UAV 100.

In detail, the first base station 110 can be configured to transmit a first periodic wideband signal 106 using a first beam 114, wherein the second base station 112 can be configured to transmit a second periodic wideband signal 108 using a second beam 114. Thereby, the first beam 114 and the second beam 116 face and overlap each other to create a flight path 118 for the UAV 100. The beams 114 and 116 may have beam widths of 10° (or 20°, or 15°, or 7° or 5°) or less In other words, the first base station 110 can be configured to transmit the first periodic wideband signal 106 using a first beam 114 directed towards the second base station 112, wherein the second base station 112 can be configured to transmit the second periodic wideband signal 108 using a second beam 114 directed towards the first base station, e.g., such that the first beam 114 and the second beam 116 overlap thereby defining a flight path 118 for the UAV 100.

The two base stations 110 and 112 can be connected or in communication to each other in order to time synchronize the transmission of the two periodic wideband signals 106 and 108. Further or alternatively, the navigation system 120 can comprise a central control system 122 configured to time synchronize the transmission of the two periodic wideband signals 106 and 108, e.g., by controlling the base stations 110 and 112 to transmit the two periodic wideband signals 106 and 108 at the same transmission time (or time instant).

Subsequently, embodiments of both the UAV 100 and the UAV navigation system 120 are described in further detail.

The first periodic wideband signal 106 and the second periodic wideband signal 108 can be located in the extremely high frequency band (or millimeter band, e.g., 30 to 300 GHz). The first periodic wideband signal 106 and the second periodic wideband signal 108 can have a bandwidth of 1 GHz (30 cm precision) to 30 GHz (1 cm precision). For example, the first periodic wideband signal 106 and the second periodic wideband signal 108 can be periodic wideband beacons, such as pulses and FMCW (FMCW=frequency modulated continuous wave radar).

The first periodic wideband signal 106 and the second periodic wideband signal 108 can be orthogonal to each other. For example, different frequency bands (f_a to f_b & f_b to f_c), spreading with orthogonal spreading codes (e.g. Gold code) or spatial multiplexing (directional antennas on UAV facing in different directions).

The receiver 102 of the UAV can be configured to use a window function (or window functions) for receiving the first periodic wideband signal 106 and the second periodic wideband signal 108. For example, the receiver 102 can be configured to apply a window function (or window functions) to a receive signal in order to receive the first periodic wideband signal 106 and the second periodic wideband signal 108. The window function may reduce multi-path propagation effects thereby increasing the accuracy of the position determination.

As already mentioned, the base stations 110 and 112 use facing beams 114 and 116 for transmitting the periodic wideband signals 114 and 116, in order to define a flight path 118 for the UAV 100 that extends between the first base station 110 and the second base station 112.

The UAV 100 can be configured to fly along the flight path 118 defined by the facing beams 114 and 116.

The UAV navigation system 120 can be configured to transmit a control signal to the UAV 100, the control signal comprising a flight direction assigning information assigning a flight direction to the UAV 100. In that case, the UAV 100 can be configured to receive the control signal 100 and adapt its flight direction in dependence on the flight direction assigning information.

The UAV 100 can be configured to adapt its flight height in dependence on a flight direction. Further, the UAV navigation system 120 can be configured to transmit a control signal to the UAV 100, the control signal comprising a flight height assigning information assigning a flight height to the UAV 100. In that case, the UAV 100 can be configured to receive the control signal and adapt its flight height in dependence on the flight height assigning information. The UAV 100 can comprise, for example, a barometer in order to determine its flight height. Hereby it is possible to assign different flight heights to different UAVs, such that the same flight path 118 can be used by more than one UAV at the same time.

Note that the UAV 100 may not necessarily fly in the center of the flight path 118, which may extend along the main or center beam directions of the two facing beams 114 and 116. It is also possible that the UAV 100 is configured to fly offset to the center of the flight path (offset navigation), e.g., parallel to the center of the flight path 118 at a defined distance to the center of the flight path 118. Thereby, the UAV 100 can be configured to adapt the distance to the center of the flight path in dependence on a flight direction or a control signal received from the UAV navigation system 120, the control signal comprising a flight offset assigning information. Hereby it is possible that the same flight path 118 may be used by more than one UAV at the same time.

Figure 4:
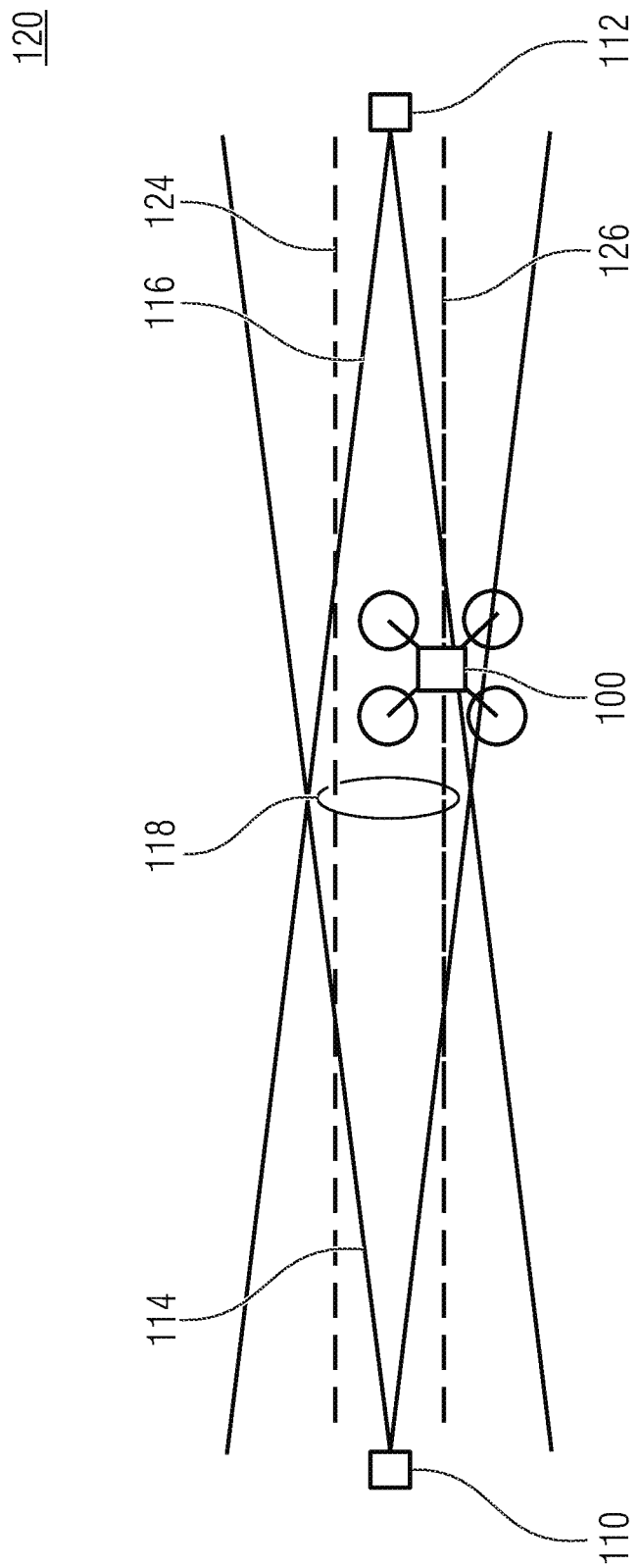
FIG. 4 shows a schematic top view of a navigation system for unmanned aerial vehicles and of an unmanned aerial vehicle, according to an embodiment.

Further note that the flight path 118 for UAV may comprise at least two flight lanes, e.g., one or more flight lanes per flight direction, as will become clear from the following discussion of FIG. 4, which shows a schematic top view of an UAV navigation system 120 and of an UAV 100, according to an embodiment. As shown in FIG. 4, the spaced apart flight lanes 124 and 126 may extend parallel to each other, e.g., in a horizontal direction and/or vertical direction. The UAV 100 can be configured to select one out of the least two flight lanes 124 and 126 based on a flight direction. Further, it is possible that the UAV navigation system 120 transmits a control signal comprising a flight lane assigning information assigning one of the two flight lanes 124 and 126 to the UAV 100. In that case, the UAV 100 can be configured to select one out of the two flight lanes 124 and 126 based on the flight lane assigning information received from the UAV navigation system 100.

Hereby it is possible to assign different flight lanes to different UAVs, such that the same flight path 118 may be used by more than one UAV at the same time.

Figure 5:
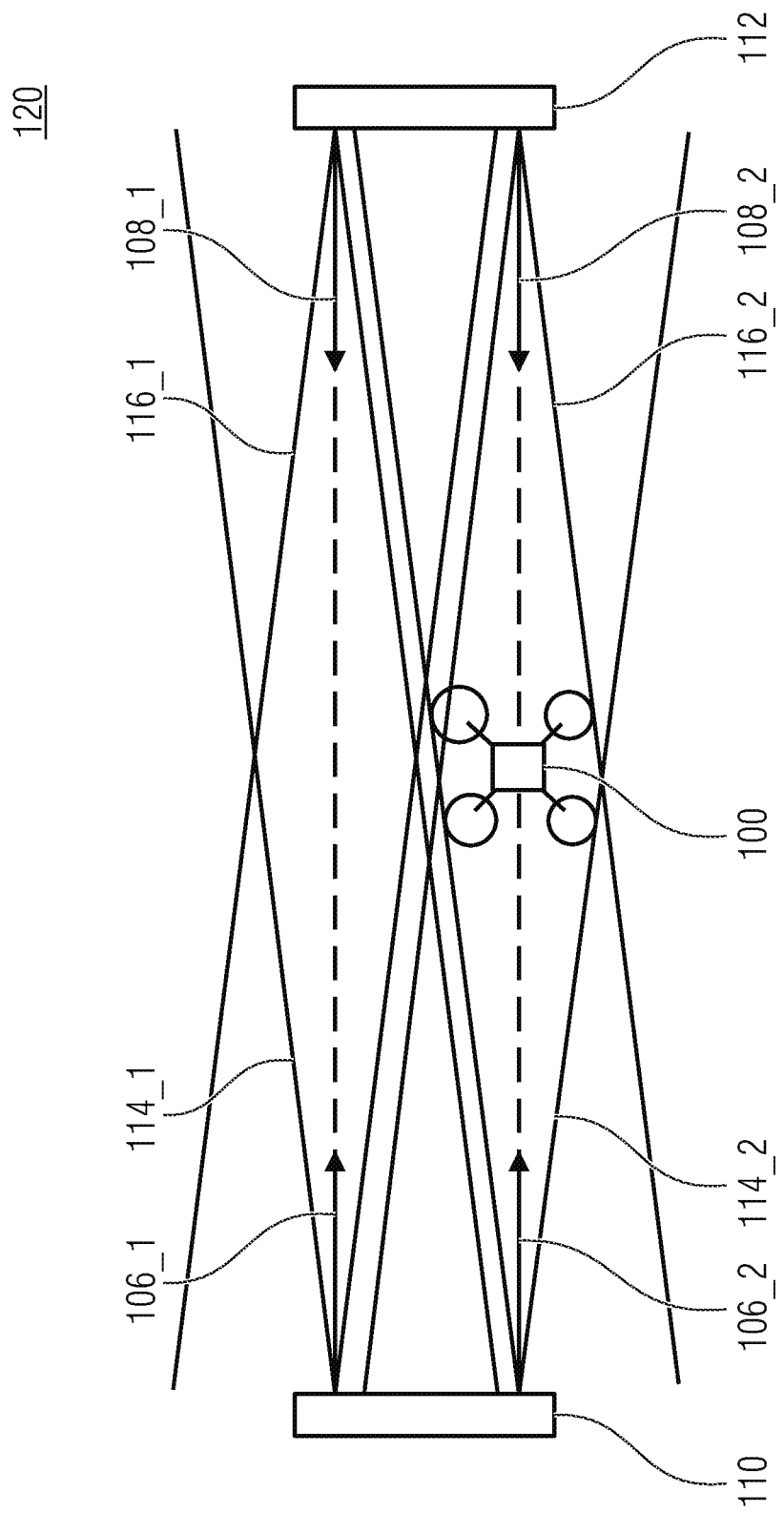
FIG. 5 shows a schematic top view of a navigation system for unmanned aerial vehicles and of an unmanned aerial vehicle, according to an embodiment.

FIG. 5 shows a schematic top view of an UAV navigation system 120 and of an UAV 100, according to an embodiment. In FIG. 5, the two base stations 110 and 112 are configured to transmit four time-synchronized periodic wideband signals 106_1, 106_2, 108_1 and 108_2 using four beams 114_1, 114_2, 116_1 and 116_2, wherein two of the four beams of the two base stations face each other, respectively, to create two flight paths 118_1 and 118_2 between the two base stations 110 and 112.

In detail, the first base station 110 can be configured to transmit a first periodic wideband signal 106_1 using a first beam 114_1 and a second periodic wideband signal 106_2 using a second beam 114_2. The second base station 112 can be configured to transmit a third periodic wideband signal 108_1 using a third beam 116_1 and a fourth periodic wideband signal 108_2 using a fourth beam 116_2. The first beam 114_1 and the third beam 116_1 face each other to define a first flight path 118_1 for the UAV 100, wherein the second beam 114_2 and the fourth beam 116_2 face each other to define a second flight path 118_2 for the UAV 100.

The UAV 100 can be configured to select one out of the two flight paths 118_1 and 118_2 between the two base stations 110 and 112 based on a flight direction. Further, the UAV navigation system 120 can be configured to transmit a control signal to the UAV 100, the control signal comprising a flight path assigning information assigning one of the two flight path 118_1 and 118_2 to the UAV 100. In that case, the UAV 100 can be configured to select one out of the two flight paths 118_1 and 118_2 between the two base stations 110 and 112 based on the flight path assigning information received from the UAV navigation system 120.

Note that it is also possible that at least one of the flight paths 118_1 and 118_2 comprises at least two flight lanes, as discussed with reference to FIG. 4, which may apply to one or both of the flight paths 118_1 and 118_2 of FIG. 5.

FIG. 6a shows a schematic side view of an UAV navigation system 120 and of two UAVs 100_1 and 100_2. As already mentioned and described in detail above, the UAV navigation system 120 comprises two base stations 110 and 112 transmitting periodic wideband signals 106 and 108 using facing beams 114 and 116. FIG. 6b shows in a diagram a time delay of a reception of the two periodic wideband signals 106 and 108 plotted over a position along the flight path 118 between the two base stations 110 and 112. FIG. 6c shows in a diagram a received power of the two periodic wideband signals 106 and 108 plotted over a position along the flight path 118 between the two base stations 110 and 112.

The basic structure of the proposed solution is a UAV positioning system 120 based on highly directive mm-wave beams 114 and 116 and a synchronized transmission of wideband pulses 106 and 108. Equipped with a simple radio receiver module 102 (see FIG. 2), the UAV 100 can be able to reliably determine its current location and also the designated flight direction. This solution is independent from the availability of a satellite positioning system and can therefore be used indoor or as a redundant system for areas with limited GNSS coverage, for instance in urban canyons near ground level.

Positioning can be accomplished with a synchronized transmission of wideband pulse 106 and 108 and the detection of these pulses 106 and 108 at the UAV 100. The detected time difference between the pulses 106 and 108 allows the UAV 100 to estimate its position along the beams 114 and 116. Apart from the time difference, the intensity of the pulses 106 and 108 can be used for estimation of the current position. Compared to using the signal strength only, the pulses make the positioning not vulnerable to multipath reflections, which are common in indoor environments. For instance, the use of a 1 GHz pulse and a time windowing function enables the elimination of multipath components equivalent to 30 cm path length difference. This multipath suppression capability is sufficient for the envisioned application scenarios.

As shown in FIG. 6, the proposed solution also allows for a two-way UAV traffic flow. This is accomplished by designating each flight direction a different airway height, hence a height offset between UAVs. The UAV may maintain its designated height by using barometer sensors, which are sufficiently accurate to accomplish this task.

For example, a first height may be assigned to a first flight direction (e.g., towards the first base station (mm-wave beacon node A) 110) and a second height may be assigned to a second flight direction (e.g., towards the second base station (mm-wave beacon node B) 112), such that a first UAV 100_1 flying in the first flight direction flies at the first flight height, wherein a second UAV 100_2 flying in the second flight direction flies at the second flight height.

FIG. 7a shows a schematic top view of an UAV navigation system 120 and of four UAVs 100_1 and 100_4. Similar to FIG. 5, the two base stations 110 and 112 are configured to transmit four time-synchronized periodic wideband signals 106_1, 106_2, 108_1 and 108_2 using four beams 114_1, 114_2, 116_1 and 116_2, wherein two of the four beams of the two base stations face each other, respectively, to create two flight paths between the two base stations 110 and 112. In addition to FIG. 5, in FIG. 7a it indicated that different flight heights can be assigned to different flight directions within each flight path. This is also indicated in further detail in FIG. 7b, which shows a cross-sectional view of the two flight paths going from the second base station 112 to the first base station (mm-wave beacon node A) 110.

For example, a first flight height can be assigned to the third and fourth UAVs 100_3 and 100_4 flying in a first direction (e.g., towards the first base station (mm-wave beacon node A) 110), wherein a second flight height can be assigned to the first and second UAVs 100_1 and 100_2 flying in a second direction (e.g., towards the second base station (mm-wave beacon node B) 112).

FIG. 8 shows a schematic top view of an UAV navigation system 120, according to an embodiment. As shown in FIG. 8, the navigation system can further comprise a relay base station 130 arranged in the flight path 118 between the two base stations 110 and 112 and configured to retransmit the periodic wideband signals 106 108 received from the two base stations 110 and 112 to the respective other base station of the two base stations 110 and 112 using two beams facing the respective beams of the two base stations 110 and 112.

In detail, the relay base station 130 can be configured to receive the first periodic wideband signal 106 from the first base station 110 and to retransmit the first periodic wideband signal 106' to the second base station 112 using a third beam 114' facing the second beam 116 of the second base station 112. Further, the relay base station 130 can be configured to receive the second periodic wideband signal 108 from the second base station 112 and to retransmit the second periodic wideband signal 108' to the first base station using a fourth beam 116' facing the first beam 114 of the first base station 110.

Figure 9:
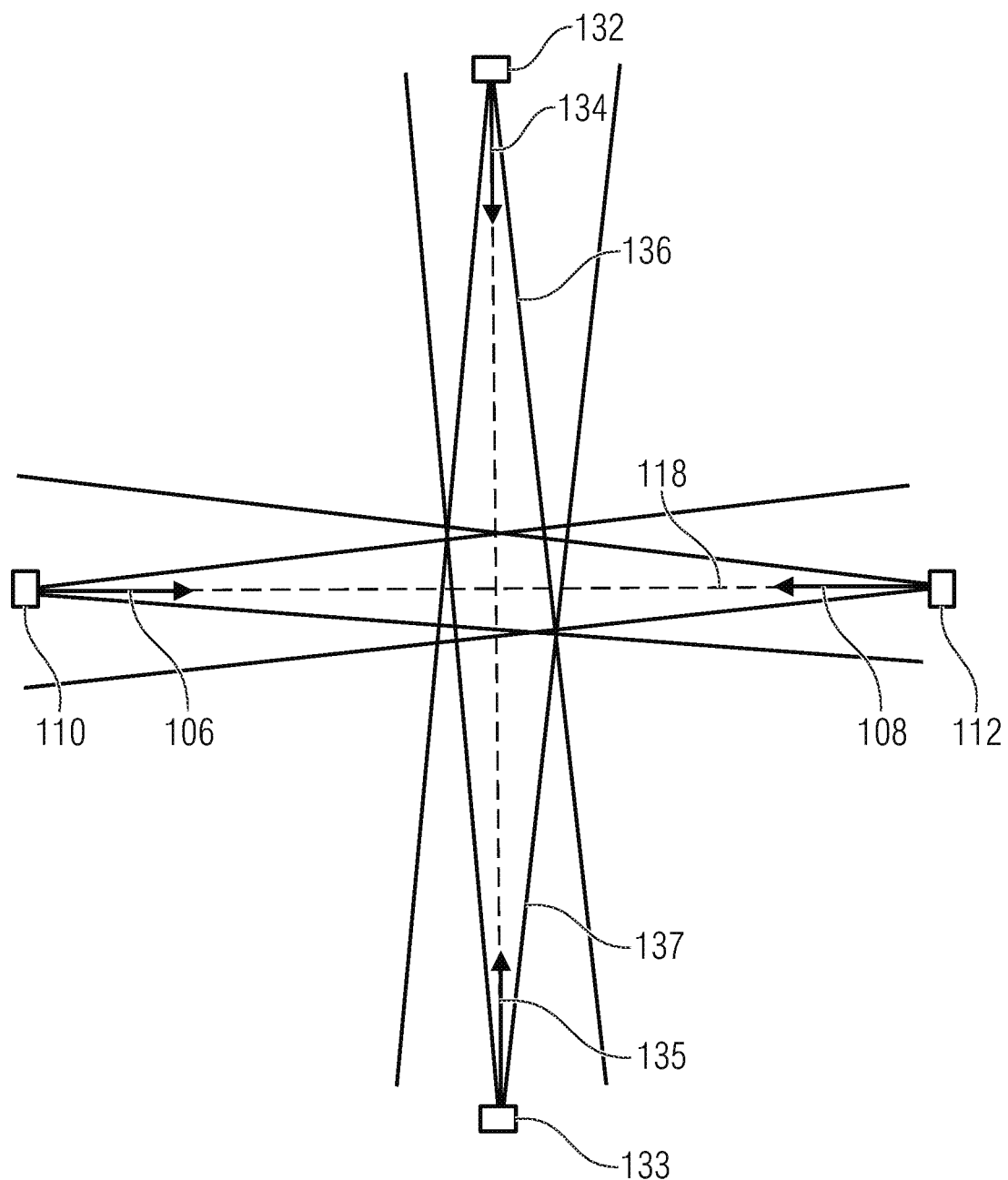
FIG. 9 shows a schematic top view of an UAV navigation system 120, according to an embodiment.

FIG. 9 shows a schematic top view of an UAV navigation system 120, according to an embodiment. As shown in FIG. 9, the navigation system 120 can comprise two further base stations 132 and 133 configured to transmit two further time-synchronized periodic wideband signals 134 and 135 using further beams 136 and 137 facing each other to create a further flight path 138, wherein the flight path 118 and the further flight path 138 cross each other (intersection).

Figure 10:
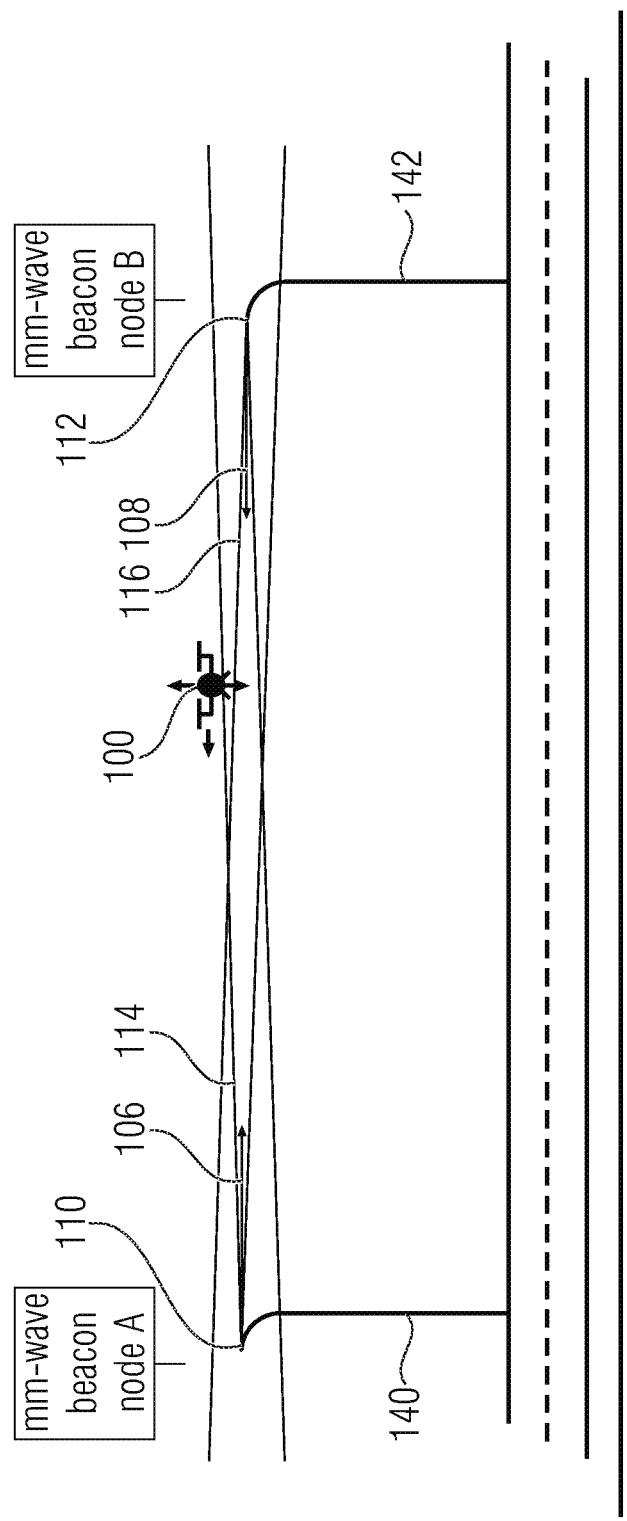
FIG. 10 shows a schematic top view of an UAV navigation system 120, according to an embodiment.

FIG. 10 shows an application example of the UAV navigation system 120 in which the base stations 110 and 112 are integrated in street lamp 140 and 142. In other words, FIG. 8 shows a possible application example, where the mm-wave beacon nodes 110 and 112 are installed on two lamp posts and UAV 100 flies along the defined airway.

Embodiments provide the following benefits. First, automated and safe navigation of UAVs with limited (in street canyons) or no (indoor) GNSS coverage. Second, mm-wave beam infrastructure reduces the costs per UAV, since costly sensors and computationally costly data processing become obsolete. Third, mm-wave beam infrastructure can be used as both: as a navigation system and as a high data rate communication system. Fourth, secure against attacks on GNSS signal: "GNSS spoofing" [M. L. Psiaki and T. E. Humphreys, "GNSS Spoofing and Detection," in Proceedings of the IEEE, vol. 104, no. 6, pp. 1258-1270, June 2016]—as it doesn't use GNSS. Fifth, securing obstacle-free airways can easily be accomplished, since obstruction of the line-of-sight beam is directly detected by the system. Navigation along LOS beam has by definition no obstacle. Flyable paths are inherently without obstacles (buildings etc.), which makes path planning simpler. One advantage of such a system based on defined UAV "air ways" is the fact that the search for "flyable paths in 3D" without any obstacles, as stated in [M. Shanmugavel, A. Tsourdos and B. A. White, "Collision avoidance and path planning of multiple UAVs using flyable paths in 3D," Methods and Models in Automation and Robotics (MMAR), 2010 15th International Conference on, Miedzyzdroje, 2010, pp. 218-222] is not further needed.

Embodiments may be applied in several fields. For example, future UAV systems, for instance used for delivery services, usually fly along predefined paths in order to reach their assigned destination. Similar to airplanes, the installation of so-called airways guarantees that the UAV stays on the designated route.

The proposed solution permits the installation of an UAV navigation network. Such a system enables "a large number of relatively low-cost UAVs to fly beyond-line-of-sight without costly sensing and communication systems or substantial human intervention in individual UAV control. Under current free-flight-like paradigm, wherein a UAV can travel along any route as long as it avoids restricted airspace and altitudes. However, this may entail expensive on-board sensing and communication as well as substantial human effort in order to ensure avoidance of obstacles and collisions. The increased cost serves as an impediment to the emergence and development of broader UAV applications. Available GPS-based navigation can be used to fly the UAV along the selected route and time schedule with relatively low added cost, which therefore, reduces the barrier to entry into new UAV-applications market."

Figures 11, 12, 13:
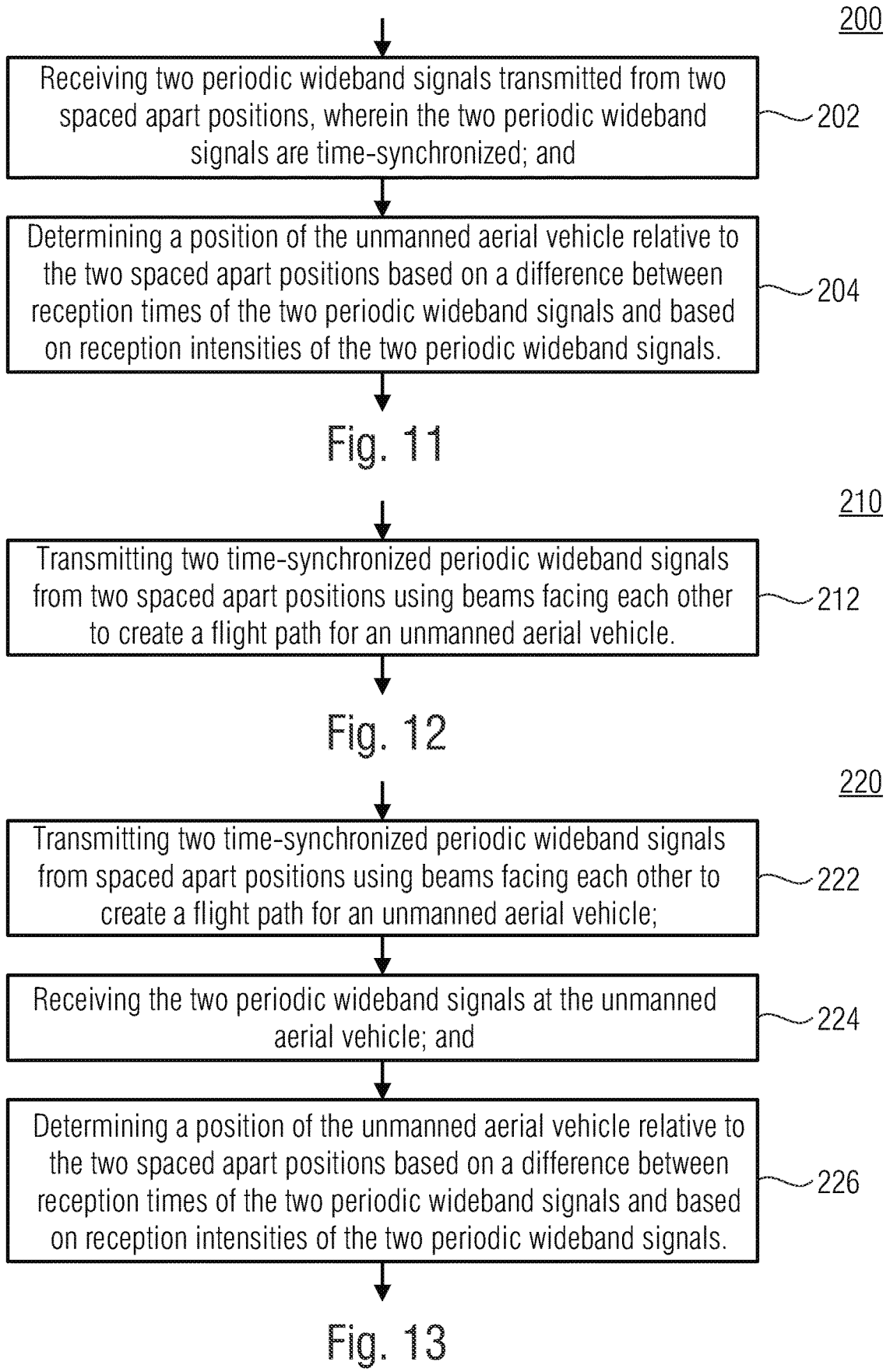
FIG. 11 shows a flowchart of a method according to an embodiment.
FIG. 12 shows a flowchart of a method according to an embodiment.
FIG. 13 shows a flowchart of a method according to an embodiment.

FIG. 11 shows a flowchart of a method 200, according to an embodiment. The method 200 comprises a step 202 of receiving two periodic wideband signals transmitted from two spaced apart positions, wherein the two periodic wideband signals are time-synchronized. Further, the method 202 comprises a step 204 of determining a position of the unmanned aerial vehicle relative to the two spaced apart positions based on a difference between reception times of the two periodic wideband signals and based on reception intensities of the two periodic wideband signals.

FIG. 12 shows a flowchart of a method 210, according to an embodiment. The method 210 comprises a step 212 of transmitting two time-synchronized periodic wideband signals from two spaced apart positions using beams facing each other to create a flight path for an unmanned aerial vehicle.

FIG. 13 shows a flowchart of a method 220, according to an embodiment. The method 220 comprises a step 222 of transmitting two time-synchronized periodic wideband signals from spaced apart positions using beams facing each other to create a flight path for an UAV. Further, the method 220 comprises a step 224 of receiving the two periodic wideband signals at the UAV. Further, the method comprises a step 226 of determining a position of the unmanned aerial vehicle relative to the two spaced apart positions based on a difference between reception times of the two periodic wideband signals and based on reception intensities of the two periodic wideband signals.

In embodiments, the UAV navigation system 120 comprises two mm-wave beacon nodes 110 and 112 transmitting synchronized orthogonal beacons 106 and 108 using narrow beams facing each other to create a flight path for the UAV 100. Thereby, positioning of the UAV can be accomplished by detecting an intensity and time difference of the beacons 106 and 108. Further, a position-based navigation and control of the UAV 100 may be performed.

Some embodiments provide multi-path suppression. For that purpose, orthogonal wideband beacons (pulse, FMCW, etc.) can be transmitted. Further or alternatively, a time windowing can be used to reduce multi-path effects.

Some embodiments provide offset navigation. Offset flight can be used to enable multiple UAVs on a single flight path by avoiding blocking.

Some embodiments provide an extension to two beams per node (or base station). Two beams per node can be introduced to enable two-way UAV flights. Further, it is possible to use barometer sensors, for example, in order to demine the flight height of the UAV and to adapt the flight height in dependence on a flight direction.

Some embodiments provide an extension to four beams per node. Thereby, four lanes per path can be created. Further, an adaptive direction control (signaling) of lanes can be used.

Some embodiments provide a flight path relay. Thereby, a relay node with two mm-wave beacons with different direction can be used. Further, offset navigation can be used to avoid collision with relay node.

Some embodiments provide an intersection. Thereby, a relay node with four mm-wave beacons can be used to create intersection of two flight paths. Further, offset navigation can be used to avoid crush with intersection node. Further, a transfer to different flight path can be used.

Some embodiments provide a central control system. A central control server and wireless control network can be introduced, for example, to collect positions of all UAVs in a field and control them simultaneously.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein.

In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An unmanned aerial vehicle, comprising:
a receiver configured to receive two periodic wideband signals transmitted from two spaced apart base stations of a navigation system for unmanned aerial vehicles, wherein the two periodic wideband signals are time-synchronized; and
a position determiner configured to determine a position of the unmanned aerial vehicle relative to the two base stations based on a difference between reception times of the two periodic wideband signals and based on reception intensities of the two periodic wideband signals,
wherein the unmanned aerial vehicle is configured to fly along a flight path that is defined by beams, wherein the beams are used by the two spaced apart base stations for transmitting the two periodic wideband signals, wherein the beams face and overlap each other,
wherein the flight path extends along main beam directions of the beams that are generated by the two spaced apart base stations using directional antennas.

2. The unmanned aerial vehicle according to claim 1, wherein the two periodic wideband signals are orthogonal to each other.

3. The unmanned aerial vehicle according to claim 1, wherein the receiver is configured to receive the two periodic wideband signals using a time window function, to reduce multi-path propagation effects.

4. The unmanned aerial vehicle according to claim 1, wherein the unmanned aerial vehicle is configured to adapt its flight height in dependence on a flight direction or a control signal received from the navigation system for unmanned aerial vehicles, the control signal comprising a flight height assigning information.

5. The unmanned aerial vehicle according to claim 4, wherein the unmanned aerial vehicle comprises a barometer in order to determine its flight height.

6. The unmanned aerial vehicle according to claim 1, wherein the unmanned aerial vehicle is configured to select the flight path out of at least two flight paths between the two base stations based on a control signal received from the navigation system for unmanned aerial vehicles, the control signal comprising a flight path assigning information, wherein each of the flight paths is defined by two beams, wherein the two beams are used for transmitting the two wideband signals corresponding to the respective flight path, wherein the two beams face each other.

7. The unmanned aerial vehicle according to claim 6, wherein the unmanned aerial vehicle is configured to adapt its flight height within the corresponding flight path in dependence on a flight direction or a control signal received from the navigation system for unmanned aerial vehicles, the control signal comprising a flight height assigning information.

8. The unmanned aerial vehicle according to claim 1, wherein the unmanned aerial vehicle is configured to receive a control signal from the navigation system for unmanned aerial vehicles, the control signal comprising a flight direction assigning information, wherein the unmanned aerial vehicle is configured to adapt its flight direction according to the flight direction assigning information.

9. A navigation system for unmanned aerial vehicles, the navigation system comprising:
two spaced apart base stations that are configured to transmit two time-synchronized periodic wideband signals;
wherein the two base stations are adapted to transmit the two periodic wideband signals using beams, wherein the beams face and overlap each other thereby defining a flight path for an unmanned aerial vehicle.

10. The navigation system according to claim 9, wherein the two periodic wideband signals are orthogonal to each other.

11. The navigation system according to claim 9, wherein the beams comprise beam widths of 10° or less.

12. The navigation system according to claim 9, wherein the two base stations are configured to transmit the two periodic wideband signals in the extremely high frequency band.

13. The navigation system according to claim 9, wherein the two base stations are configured to transmit four time-synchronized periodic wideband signals using four beams, wherein two of the four beams of the two base stations face each other, respectively, to create two flight paths between the two base stations.

14. The navigation system according to claim 13, wherein the navigation system is configured to transmit a control signal to the unmanned aerial vehicle, the control signal comprising a flight path assigning information assigning one of the two flight paths to the unmanned aerial vehicle.

15. The navigation system according to claim 9, wherein the navigation system is configured to transmit a control signal to the unmanned aerial vehicle, the control signal comprising a flight height assigning information assigning a flight height to the unmanned aerial vehicle.

16. The navigation system according to claim 9, wherein the navigation system is configured to transmit a control signal to the unmanned aerial vehicle, the control signal comprising a flight direction assigning information assigning a flight direction to the unmanned aerial vehicle.

17. The navigation system according to claim 9, the navigation system comprising a relay base station arranged in the flight path between the two base stations and configured to retransmit the periodic wideband signals received from the two base stations to the respective other base station of the two base stations using two beams facing the respective beams of the two base stations.

18. The navigation system according to claim 9, the navigation system comprising two further base stations configured to transmit two further time-synchronized periodic wideband signals using further beams facing each other to create a further flight path,
wherein the flight path and the further flight path cross each other.

19. A method, the method comprising:
receiving two periodic wideband signals at an unmanned aerial vehicle, wherein the two periodic wideband signals are transmitted from two spaced apart base stations, wherein the two periodic wideband signals are time-synchronized; and determining a position of the unmanned aerial vehicle relative to the two spaced apart base station based on a difference between reception times of the two periodic wideband signals and based on reception intensities of the two periodic wideband signals, flying along a flight path that is defined by beams, wherein the beams are used by the two spaced apart base stations for transmitting the two periodic wideband signals, wherein the beams face and overlap each other, wherein the flight path extends along main beam directions of the beams that are generated by the two spaced apart base stations using directional antennas.

20. A method, the method comprising:

transmitting two time-synchronized periodic wideband signals from two spaced apart base stations using beams, wherein the beams face and overlap each other thereby defining a flight path for an unmanned aerial vehicle, wherein the flight path extends along main beam directions of the beams that are generated by the two spaced apart base stations using directional antennas.

21. A method, the method comprising:

transmitting two time-synchronized periodic wideband signals from spaced apart positions using beams, wherein the beams face and overlap each other thereby defining a flight path for an unmanned aerial vehicle;

receiving the two periodic wideband signals at the unmanned aerial vehicle; and determining a position of the unmanned aerial vehicle relative to the two spaced apart positions based on a difference between reception times of the two periodic wideband signals and based on reception intensities of the two periodic wideband signals, flying the unmanned aerial vehicle along the flight path that is defined by the beams, wherein the flight path extends along main beam directions of the beams that are generated by the two spaced apart base stations using directional antennas.

22. A non-transitory digital storage medium having a computer program stored thereon to perform the method, the method comprising:

receiving two periodic wideband signals at an unmanned aerial vehicle, wherein the two periodic wideband signals are transmitted from two spaced apart base stations, wherein the two periodic wideband signals are time-synchronized; and determining a position of the unmanned aerial vehicle relative to the two spaced apart positions based on a difference between reception times of the two periodic wideband signals and based on reception intensities of the two periodic wideband signals, flying the unmanned aerial vehicle along a flight path that is defined by beams, wherein the beams are used by the two spaced apart base stations for transmitting the two periodic wideband signals, wherein the beams face and overlap each other, wherein the flight path extends along main beam directions of the beams that are generated by the two spaced apart base stations using directional antennas, when said computer program is run by a computer.

23. A non-transitory digital storage medium having a computer program stored thereon to perform the method, the method comprising:

transmitting two time-synchronized periodic wideband signals from two spaced apart base stations using beams, wherein the beams face and overlap each other thereby defining a flight path for an unmanned aerial vehicle, wherein the flight path extends along main beam directions of the beams that are generated by the two spaced apart base stations using directional antennas, when said computer program is run by a computer.

24. A non-transitory digital storage medium having a computer program stored thereon to perform the method, the method comprising:

transmitting two time-synchronized periodic wideband signals from two spaced apart base stations using beams, wherein the beams face and overlap each other thereby defining a flight path for an unmanned aerial vehicle;

receiving the two periodic wideband signals at the unmanned aerial vehicle; and determining a position of the unmanned aerial vehicle relative to the two spaced apart positions based on a difference between reception times of the two periodic wideband signals and based on reception intensities of the two periodic wideband signals, flying the unmanned aerial vehicle along the flight path that is defined by the beams, wherein the flight path extends along main beam directions of the beams that are generated by the two spaced apart base stations using directional antennas when said computer program is run by a computer.

* * * * *